United States Patent
Wada (10) Patent No.: US 8,736,715 B2
(45) Date of Patent: May 27, 2014

(54) IMAGING DEVICE, IMAGING DEVICE CONTROL METHOD, AND PROGRAM

(75) Inventor: Yuji Wada, Tokyo (JP)

(73) Assignee: Sony Corporation, Tokyo (JP)

( * ) Notice: Subject to any disclaimer, the term of this patent is extended or adjusted under 35 U.S.C. 154(b) by 108 days.

(21) Appl. No.: 13/411,838

(22) Filed: Mar. 5, 2012

(65) Prior Publication Data

US 2012/0262602 A1   Oct. 18, 2012

(30) Foreign Application Priority Data

Apr. 18, 2011   (JP) ................... 2011-092029

(51) Int. Cl.
*H04N 5/76* (2006.01)

(52) U.S. Cl.
USPC .................... 348/231.4; 348/231.99

(58) Field of Classification Search
USPC ......................... 348/231.4, 231.99
See application file for complete search history.

(56) References Cited

U.S. PATENT DOCUMENTS

| | | |
|---|---|---|
| 5,130,812 A | 7/1992 | Yamaoka |
| 7,116,362 B2 * | 10/2006 | Kitajima et al. ........... 348/231.4 |
| 7,990,456 B2 * | 8/2011 | Inoue et al. .............. 348/333.02 |
| 2001/0026263 A1 * | 10/2001 | Kanamori et al. ............ 345/156 |
| 2002/0097323 A1 | 7/2002 | Ito |
| 2002/0112112 A1 | 8/2002 | Yoshida |
| 2003/0076438 A1 | 4/2003 | Ishimaru |
| 2003/0147637 A1 | 8/2003 | Sasagawa |
| 2003/0174218 A1 * | 9/2003 | Battles et al. .............. 348/231.4 |
| 2005/0212943 A1 | 9/2005 | Karasaki et al. |
| 2008/0055419 A1 | 3/2008 | Ito |

FOREIGN PATENT DOCUMENTS

JP   2009-284234   12/2009

OTHER PUBLICATIONS

Extended European Search Report issued May 7, 2012 in corresponding European Application No. 12157757.1.

* cited by examiner

*Primary Examiner* — Anthony J Daniels
(74) *Attorney, Agent, or Firm* — Oblon, Spivak, McClelland, Maier & Neustadt, L.L.P.

(57) ABSTRACT

Shutter operation information of a user is input and an audio-recording start and end are controlled according to the input shutter operation information. Audio-recording start and end timings are determined by identifying independent shutter operation information corresponding to audio-recording start and end requests. Specifically, for example, the audio-recording start and end timings are controlled by identifying a half pressing/release process or a full pressing/release process of the shutter different from shutter operation information used in automatic exposure control (AE) or automatic focus control (AF) start control.

12 Claims, 5 Drawing Sheets

IMAGING DEVICE, IMAGING DEVICE CONTROL METHOD, AND PROGRAM

BACKGROUND

The present disclosure relates to an imaging device, an imaging device control method, and a program, and more particularly, to an imaging device, an imaging device control method, and a program that record an audio along with an image.

At present, imaging devices (cameras) that record audio information in conjunction with an image according to multiple functions of the imaging devices are widely used.

For example, Japanese Patent Application Laid-Open No. 2009-284234 discloses an imaging device that starts audio recording on the basis of the detection of half pressing of a shutter button for capturing an image, captures the image according to the detection of full pressing of the shutter button, and stops the audio recording after a predetermined time has elapsed.

However, it is common to start an automatic exposure control (AE) or automatic focus control (AF) process on the basis of the detection of half pressing of the shutter button. In the configuration of the related art described above, AE/AF control start timing is always identical with audio-recording start timing.

Accordingly, there is a problem in that it is not possible to start audio recording at various timings desired by a user, for example, before the AE/AF operation, or when the audio recording is intended to be started thereafter.

In addition, for audio-recording end timing as well, there is a problem in that the user cannot freely set the audio-recording end timing because audio recording is uniformly ended when a fixed time has elapsed after an image capture in the configuration of the related art described above.

SUMMARY

It is desirable to provide an imaging device, an imaging device control method, and a program that can control an audio-recording start or end at arbitrary timing desired by a user.

The first aspect of the present disclosure is an imaging device including a control unit for controlling audio recording to be started and ended according to shutter button operation information. The control unit determines audio-recording start and end timings by identifying independent shutter button operation information corresponding to audio-recording start and end requests.

Further, according to an embodiment of the present disclosure, the control unit determines the audio-recording start and end timings by identifying shutter button operation information different from shutter button operation information as automatic exposure control (AE) or automatic focus control (AF) start control.

Further, according to an embodiment of the present disclosure, the control unit determines the audio-recording start or end timing by identifying a half pressing/release process of a shutter button as the independent shutter button operation information corresponding to the audio-recording start or end request Further, according to an embodiment of the present disclosure, the control unit determines the audio-recording end timing by identifying a full pressing/release process of a shutter button as the independent shutter button operation information corresponding to the audio-recording end request.

Further, according to an embodiment of the present disclosure, the control unit controls the audio recording to be continued for a continuation period of a half pressed state of a shutter button by identifying the half pressed state of the shutter button to be executed during the audio recording.

Further, according to an embodiment of the present disclosure, the control unit controls the audio recording to be continued for a continuation period of a fully pressed state of a shutter button by identifying the fully pressed state of the shutter button to be executed during the audio recording.

Further, according to an embodiment of the present disclosure, the control unit controls the audio recording to be ended according to a passage of a preset time when there is no operation corresponding to the audio-recording end request during the audio recording.

Further, according to an embodiment of the present disclosure, the control unit controls a time allowed for the audio recording to be displayed on a display unit.

Further, the second aspect of the present disclosure is an imaging device control method to be executed in an imaging device, including controlling, by a control unit, audio recording to be started and ended according to shutter button operation information. The audio-recording control step includes determining, by the control unit, an audio-recording start or end timing by identifying independent shutter button operation information corresponding to an audio-recording start or end request.

Further, the third aspect of the present disclosure is a program for causing an imaging device to execute an audio-recording control process, including controlling, by a control unit, audio recording to be started and ended according to shutter button operation information. The audio-recording control step includes determining, by the control unit, an audio-recording start or end timing by identifying independent shutter button operation information corresponding to an audio-recording start or end request.

The program of the present disclosure is a program that can be provided by a storage medium or a communication medium in a computer-readable format, for example, to an information processing device or a computer system that can execute various program codes. By providing this program in the computer-readable format, a process corresponding to the program can be executed on the information processing device or the computer system.

Further objects, features, and advantages of the present disclosure will become apparent from the detailed description of embodiments with reference to the attached drawings. In this specification, the system is a logical set including a plurality of devices. It is not necessary that the devices be in the same housing.

According to the embodiments of the present disclosure described above, it is possible to implement an imaging device and an imaging device control method capable of executing an audio-recording start or end at arbitrary timing desired by a user.

Specifically, the user's shutter operation information is input and an audio-recording start and end are controlled according to the input shutter operation information. Audio-recording start and end timings are determined by identifying independent shutter operation information corresponding to audio-recording start and end requests. For example, the audio-recording start and end timings are controlled by identifying a half pressing/release process or a full pressing/release process of the shutter different from shutter operation information used in AE or AF start control.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, details of an imaging device, an imaging device control method, and a program will be described with reference to the drawings. Description will be given according to the following items.

1. Configuration Example of Imaging Device of Present Disclosure
2. First Embodiment: Example 1 of Audio Recording Process to be Executed by Imaging Device
3. Second Embodiment: Example 2 of Audio Recording Process to be Executed by Imaging Device
4. Other Embodiments
5. Summary of Configuration of Present Disclosure

1. Configuration Example of Imaging Device of Present Disclosure

Figure 1:
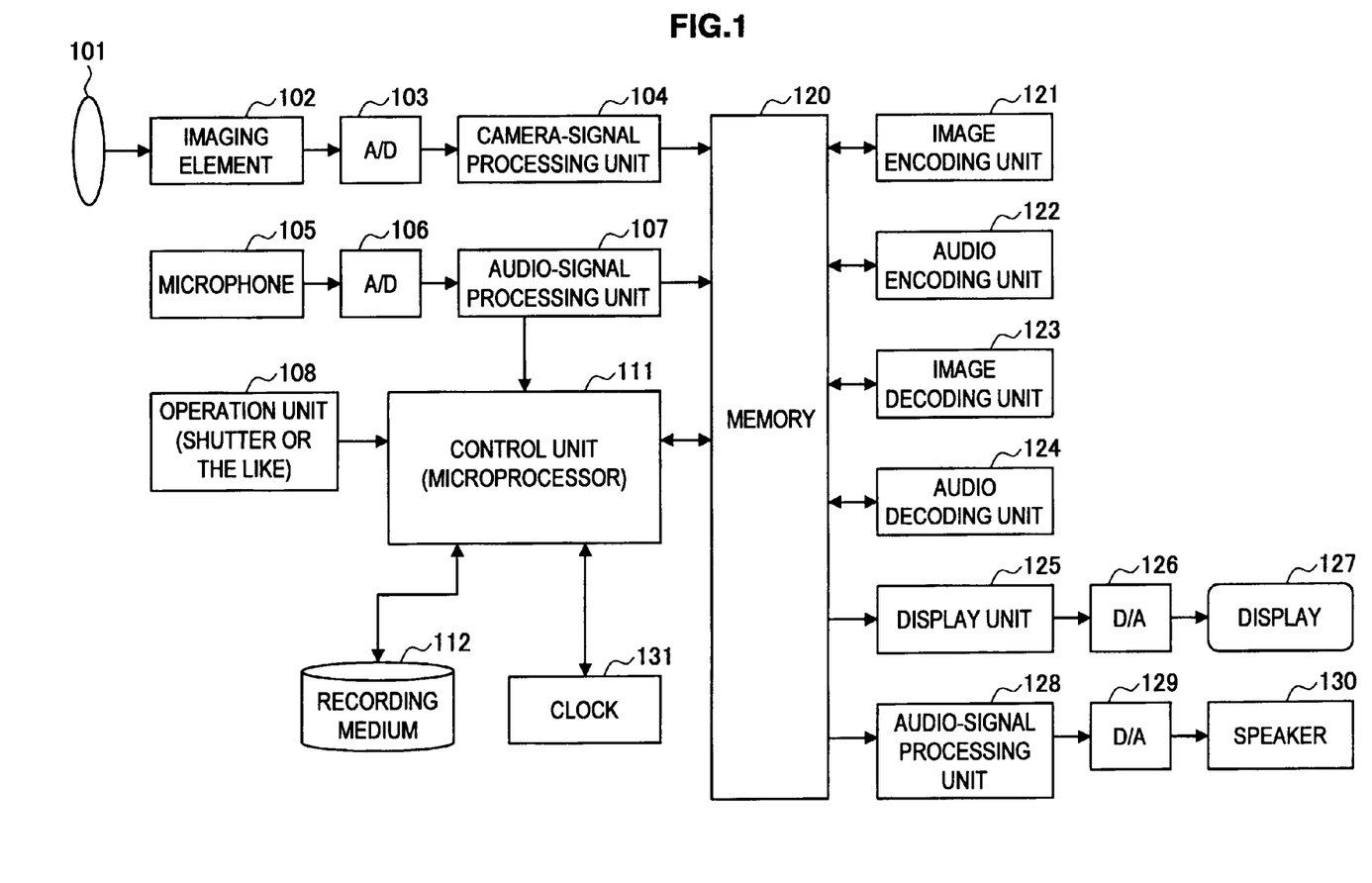
FIG. 1 is a diagram illustrating a configuration example of an imaging device of the present disclosure.

First, the configuration example of the imaging device (digital camera) of the present disclosure will be described with reference to FIG. 1. As illustrated in FIG. 1, the imaging device includes a lens 101, an imaging element 102 constituted by a complementary metal-oxide semiconductor (CMOS), a charge-coupled device (CCD), or the like, which converts an optical signal input via the lens 101 into an electrical signal, an analog-to-digital (A/D) conversion unit 103, which converts an analog electrical signal into a digital signal, a camera-signal processing unit 104, which executes signal processing of an image on the basis of captured-image data, a microphone 105 for inputting audio information, an A/D conversion unit 106, which converts an analog audio signal output from the microphone 105 into a digital signal, and an audio-signal processing unit 107, which executes signal processing of an audio on the basis of acquired audio data.

A control unit (microprocessor) 111 executes image-capture-recording process control, audio recording process control, AE/AF control, and the like. A specific process sequence will be described later in detail.

Image and audio digital data generated by the camera-signal processing unit 104 and the audio-signal processing unit 107 is stored in a memory 120. An image encoding unit 121 and an audio encoding unit 122 perform an encoding process for converting input video and audio signals into data for recording. For example, when data is read from a recording medium 112 recording imaging data for reproduction processing, an image decoding unit 123 and an audio decoding unit 124 perform a process of decoding image and audio signals read from the recording medium 112. The memory 120 temporarily retains data to be encoded or decoded.

The control unit (microprocessor) 111 controls a process to be executed in the imaging device as described above. In addition, the control unit 111 receives a user's input information from an operation unit 108 such as a shutter, various switches, or buttons. Further, date or time information from a data recording/reproduction control process using the recording medium 112 or a clock 131 or elapsed time information from various processes is input.

The operation unit 108 is a button, a switch, or the like through which the user operates the device. Specifically, the shutter (shutter button), a switch for a zoom operation, a moving-image capture key, a shutter key for a still-image capture, a touch panel, and the like are included. Information input via the operation unit 108 is transmitted to the control unit 111, and the control unit 111 performs control on the basis of the user's operation information.

The recording medium 112 is constituted by, for example, a nonvolatile memory such as a flash memory, a hard disk, or the like, and records captured image data or audio data.

The display unit 125 performs a monitor display of the captured image data or display control of data obtained by decoding data recorded on the recording medium 112 as data after imaging in the image decoding unit 123. Generation data of the display unit 125 is converted by a digital-to-analog (D/A) conversion unit 126 into an analog signal, and output to a display 127 such as a liquid crystal display (LCD) panel.

An audio-signal processing unit 128 receives an audio signal decoded by the audio decoding unit 124, converts the audio signal into an analog signal via a D/A conversion unit 129, and outputs the analog signal to a speaker 130.

2. First Embodiment

Example 1 of Audio Recording Process to be Executed by Imaging Device

Next, an example of a process to be executed by the imaging device of the present disclosure will be described with reference to the flowchart illustrated in FIG. 2 and the timing chart illustrated in FIG. 3.

A process sequence as will be described hereinafter is executed under control of the control unit 111 of the imaging device illustrated in FIG. 1. The control unit 111 controls the process, for example, according to a program pre-stored in the recording medium 112 or the memory 120.

The shutter (shutter button) provided on the operation unit 108 of the imaging device has the following three states.

(1) Half pressed state (S1 ON)
(2) Fully pressed state (S2 ON)
(3) Release state (S1 OFF or S2 OFF)

The process of processing steps will be described according to the flowchart illustrated in FIG. 2.

If half pressing (S1 ON) of the shutter of the operation unit 108 has been detected in step S101, the control unit 111 starts to control AE or AF in step S102.

Next, if a release (S1 OFF) of the half pressing of the shutter of the operation unit 108 has been detected in step S103, a determination of step S103 becomes Yes and the process proceeds to step S104 to start audio recording.

On the other hand, if the release (S1 OFF) of the half pressing of the shutter of the operation unit 108 has not been detected and the user has fully pressed the shutter (S2 ON) in step S103, the determination of step S103 becomes No and the process proceeds to step S108.

First, a process when the determination of step S103 becomes Yes and the process proceeds to step S104 will be described.

If the release (S1 OFF) of the half pressing of the shutter of the operation unit 108 has been detected in step S103, the determination of step S103 becomes Yes and the process proceeds to step S104 to start the audio recording.

That is, the execution of a half pressing/release process of the shutter by the user is used as a control signal, which starts the audio recording. Specifically, an ON/OFF operation of the half pressing of the shutter by the user is used as the control signal, which starts the audio recording.

Next, in step S105, an elapsed time is measured after the ON/OFF operation of the half pressing of the shutter by the user, and it is determined whether or not the elapsed time has exceeded a predetermined threshold time ta. If the elapsed time has exceeded the predetermined threshold time ta (the determination of step S105=Yes), the process is ended by determining that the user has no imaging intention.

On the other hand, if the elapsed time has not exceeded the predetermined threshold time to (the determination of step S105=No) and the half pressing (S1 ON) of the shutter of step S106 has been detected, the process proceeds to step S107 to re-execute the AE/AF process.

Although the AE/AF process is executed in step S102, the AE/AF process applied to an actual imaging process serves as the AE/AF process of step S107.

Next, if the full pressing (S2 ON) of the shutter is detected in step S108, an image is captured in step S109.

If a process for the release (S1 OFF) of the half pressing (S1 ON) of the shutter in step S103 described above has not detected and the full pressing of the shutter has been detected, the process proceeds from step S103 to step S108 and the image capture of step S109 is executed on the basis of a full pressing/release (S2 ON/OFF) process of the shutter.

Thereafter, in step S110, the control unit performs time measurement after the shutter is fully pressed/released, and determines whether a predetermined threshold time tb has elapsed.

If the user's operation (the process of half pressing the shutter) has been detected (the determination of step S110=No) before the passage of the predetermined threshold time tb, the process proceeds to step S111 and an half pressing/release (S1 ON/OFF) operation of the shutter is determined to be an audio-recording stop command.

That is, the execution of the process of half pressing and releasing the shutter by the user is used as a control signal, which ends the audio recording. Specifically, if the user has performed an operation of turning on/off the half pressing of the shutter, it is recognized as the control signal for the audio-recording end.

If the control unit has detected the half pressing/releasing (S1 ON/OFF) operation on the shutter in step S111, a process of stopping the audio recording and further recording a captured image and an acquired audio on a recording medium is executed in step S112. When the recording process is performed, an encoding process, format processing according to a predetermined recording format, or the like is executed and a processing result is stored in the recording medium 112. In addition, the AE/AF operation may be executed according to the half pressing (S1 ON) operation on the shutter in step S111.

On the other hand, if the user's operation (the process of half pressing the shutter) has not been detected and the passage of the predetermined time tb has been identified in step S110 (the determination of step S110=Yes), the process proceeds to step S112 by omitting step S111 and a process of stopping the audio recording and recording a captured image and an acquired audio on the recording medium is executed.

As understood from the process sequence described with reference to the flowchart illustrated in FIG. 2, an audio-recording start and end can be determined by a shutter operation independent of the AE/AF process or the still-image capture process in the first embodiment.

That is, the audio-recording start and end can be freely set by the following operations of the user.

The audio-recording start is performed in step S104, and a process (trigger) serving as a condition of the audio-recording start is a process of releasing a half pressed state of the shutter. Specifically, a series of processes including (a) the half pressing (S1 ON) of the shutter in step S101 and (b) the release (S1 OFF) of the half pressing of the shutter in step S103 is executed.

In addition, the audio-recording end is performed in step S112, and a process (trigger) serving as a condition of the audio-recording end is also the process of releasing the half pressed state of the shutter. Specifically, a process of (c) the half pressing (S1 ON) and release (S1 OFF) of the shutter in step S111 is executed.

That is, the shutter is half pressed and released as a continuous operation, so that the audio-recording start and end can be freely set and controlled without depending on processing timing of another process, that is, an image capture or an AE/AF process.

Figure 3:
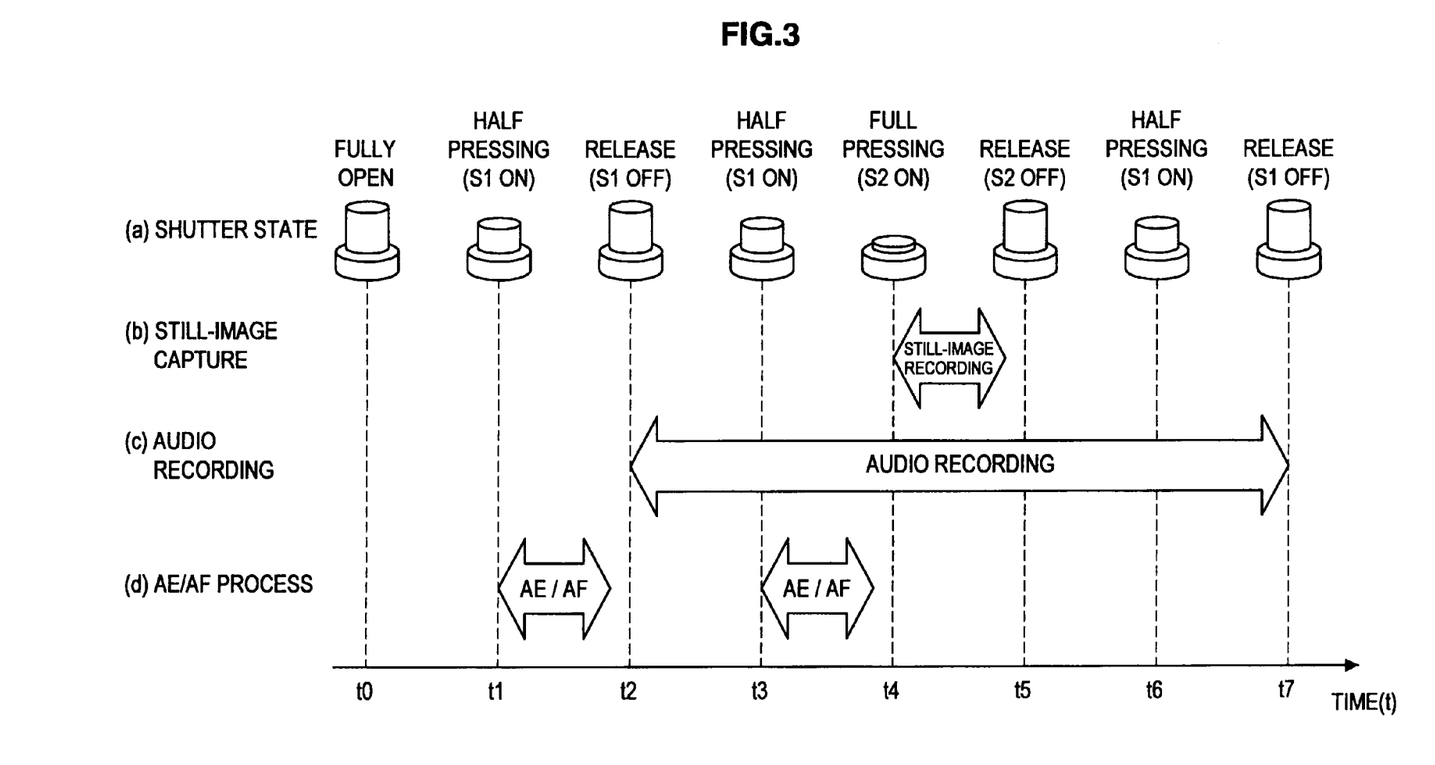
FIG. 3 is a timing chart illustrating an example of a process sequence executed by the imaging device of the present disclosure.

A timing chart of the first embodiment is illustrated in FIG. 3 so that the process of this embodiment is further easily understood.

In FIG. 3, timings of (a) shutter state transition, (b) still-image capture timing, (c) audio-recording timing, and (d) AE/AF execution timing are illustrated along a time axis t.

Although all shutter states in times t0 to t7 in FIG. 3 are varied at the same time interval with respect to (a) shutter state transition illustrated in FIG. 3, the time interval is varied by the user's process.

The following control is executed according to the shutter states of times t0 to t7.

Time: t0
Time t0 corresponds to an initial state.

Time: t1
Time t1 corresponds to a state in which the user has half pressed the shutter. The AE/AF process is executed using the half pressing process as the trigger.

Figure 2:
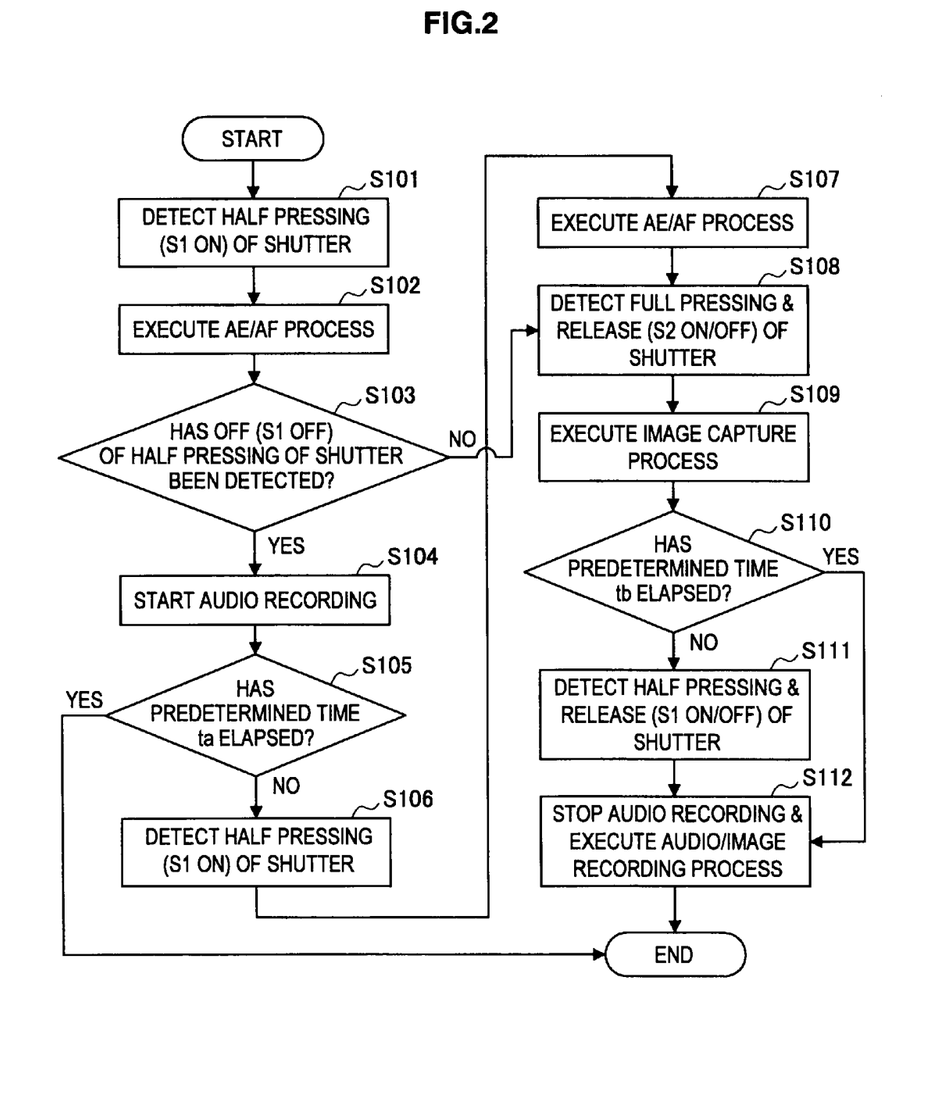
FIG. 2 is a flowchart illustrating an example of a process sequence executed by the imaging device of the present disclosure.

This process corresponds to the process of steps S101 and S102 of the flowchart illustrated in FIG. 2.

Time: t2
Time t2 corresponds to a state returned to the release state after the user half presses the shutter. The audio recording process is started using a process of returning from the half pressing to the full pressing as the trigger.

This process corresponds to the process of steps S103 and S104 of the flowchart illustrated in FIG. 2.

Time: t3
Time t3 corresponds to a state in which the user has half pressed the shutter again in the release state. The AE/AF process is re-executed using a second half pressing process as the trigger.

This process corresponds to the process of steps S106 and S107 of the flowchart illustrated in FIG. 2.

Time: t4 to t5
Times t4 to t5 corresponds to a process in which the user fully presses the shutter in the half pressed state and further switches the state to the release state. The image capture process is executed by performing a process from the half pressed state to the fully pressed state.

This process corresponds to the process of steps S108 and S109 of the flowchart illustrated in FIG. 2.

Time: t6

Time t6 corresponds to a process in which the user further half presses the shutter in the release state and then releases the shutter. The audio recording is ended using the execution of the half pressing and release processes as the trigger from the release state.

This process corresponds to the process of steps S111 to S112 of the flowchart illustrated in FIG. 2.

As illustrated in FIG. 3, a process of determining the passage of the threshold time in steps S105 and S110 illustrated in FIG. 2 is omitted.

The process of step S105 is executed between times t2 and t3 in FIG. 3. If a period of the times t2 and t3 has exceeded the predetermined threshold time ta, the time-out is reached and the process is ended. This end process corresponds to a process in which Yes is determined in the determination process of step S105 of the flowchart illustrated in FIG. 2.

In addition, the process of step S110 in the flowchart of FIG. 2 is executed between times t5 and t6 in FIG. 3. If the period of times t5 and t6 has exceeded the predetermined threshold time tb, the time-out is reached and the audio recording process is forcibly ended even if the half pressing of time t6 and a process of transition to the release state of time t7 illustrated in FIG. 3 are not executed.

The audio-recording end process corresponds to a process in which Yes is determined in the determination process of step S110 of the flowchart illustrated in FIG. 2 and transition to step S112 is taken.

As understood from the description with reference to FIG. 3, the control unit can control execution timing of each process without depending on execution timing of another process with respect to three processes of (b) still-image capture timing, (c) audio-recording timing, and (d) AE/AF execution timing.

Start and end timings of the audio recording process can be controlled by half pressing and releasing the shutter as a continuous operation.

As described above, start and end timings of the audio recording process can be set to free timings without depending on processing timing of another process, that is, the image capture or the AE/AF process, and audio recording can be started and ended according to the user's desire.

3. Second Embodiment

Example 2 of Audio Recording Process to be Executed by Imaging Device

Next, another process example (second embodiment) to be executed by the imaging device of the present disclosure will be described with reference to the flowchart illustrated in FIG. 4 and the timing chart illustrated in FIG. 5.

As in the first embodiment described above, a process sequence as will be described hereinafter is executed under control of the control unit 110 of the imaging device illustrated in FIG. 1. The control unit 111 controls the process, for example, according to a program pre-stored in the recording medium 112 or the memory 120.

The shutter provided in the operation unit 108 of the imaging device has the following three states as in the first embodiment described above.

(1) Half pressed state (S1 ON)
(2) Fully pressed state (S2 ON)
(3) Release state (S1 OFF or S2 OFF)

The process of processing steps will be described according to the flowchart illustrated in FIG. 4.

If the half pressing (S1 ON) of the shutter of the operation unit 108 has been detected in step S201, the control unit 111 starts AE and AF in step S202.

Next, if the release (S1 OFF) of the half pressing of the shutter of the operation unit 108 has been detected in step S203, the determination of step S203 becomes Yes and the process proceeds to step S204 to start audio recording.

On the other hand, if the release (S1 OFF) of the half pressing of the shutter of the operation unit 108 has not been detected and the user has fully pressed the shutter (S2 ON) in step S203, the determination of step S203 becomes No and the process proceeds to step S208.

First, a process when the determination of step S203 becomes Yes and the process proceeds to step S204 will be described.

If the release (S1 OFF) of the half pressing of the shutter of the operation unit 108 has been detected in step S203, the determination of step S203 becomes Yes and the process proceeds to step S204 to start the audio recording.

That is, an ON/OFF operation of the half pressing of the shutter by the user is used as a control signal, which starts the audio recording.

Next, in step S205, an elapsed time is measured after the ON/OFF operation of the half pressing of the shutter by the user, and it is determined whether or not the elapsed time has exceeded a predetermined threshold time ta. If the elapsed time has exceeded the predetermined threshold time ta (the determination of step S205=Yes), the process is ended by determining that the user has no imaging intention.

On the other hand, if the elapsed time has not exceeded the predetermined threshold time ta (the determination of step S205=No) and the half pressing (S1 ON) of the shutter of step S206 has been detected, the process proceeds to step S207 to re-execute the AE/AF process.

Although the AE/AF process is executed in step S202, the AE/AF process applied to an actual imaging process serves as the AE/AF process of step S207.

Next, if the full pressing (S2 ON) of the shutter is detected in step S208, an image is captured in step S209.

If a process of the release (S1 OFF) of the half pressing (S1 ON) of the shutter in step S203 described above has not detected and the full pressing of the shutter has been detected, the process proceeds from step S203 to step S208 and the image capture of step S209 is executed on the basis of a process of the full pressing (S2 ON) of the shutter.

Thereafter, the control unit detects the release (S2 OFF) of the full pressing of the shutter in step S210, and proceeds to step S211 to execute a process of stopping the audio recording and further recording a captured image and an acquired audio on a recording medium. When the recording process is performed, an encoding process, format processing according to a predetermined recording format, or the like is executed and a processing result is stored in the recording medium 112.

As understood from a process sequence described with reference to the flowchart illustrated in FIG. 4, an audio-recording start and end can also be determined by a shutter operation independent of the AE/AF process or the still-image capture process in the second embodiment.

That is, the audio-recording start and end can be freely set by the following operations of the user.

The audio-recording start is performed in step S204, and a process (trigger) serving as a condition of the audio recording start is a series of processes including (a) the half pressing (S1 ON) of the shutter in step S201 and (b) the release (S1 OFF) of the half pressing of the shutter in step S203.

In addition, the audio-recording end is performed in step S211, and a process (trigger) serving as a condition of the audio-recording end is a series of processes including (c) the full pressing (S2 ON) of the shutter in step S208 and (d) the release (S2 OFF) of the full pressing of the shutter in step S210.

That is, the shutter is half pressed and released as a continuous operation, so that the audio-recording start can be freely set. In addition, the shutter is fully pressed and released as a continuous operation, so that the audio-recording end can be freely set. As a result, the audio-recording start and end can be controlled without depending on processing timing of another process, that is, an image capture or an AE/AF process.

Because the audio-recording end is finally defined by the release (S2 OFF) of the full pressing of the shutter of step S210, it is possible to extend audio recording by an arbitrary time, for example, if the fully pressed state of the shutter is continued.

Figure 5:
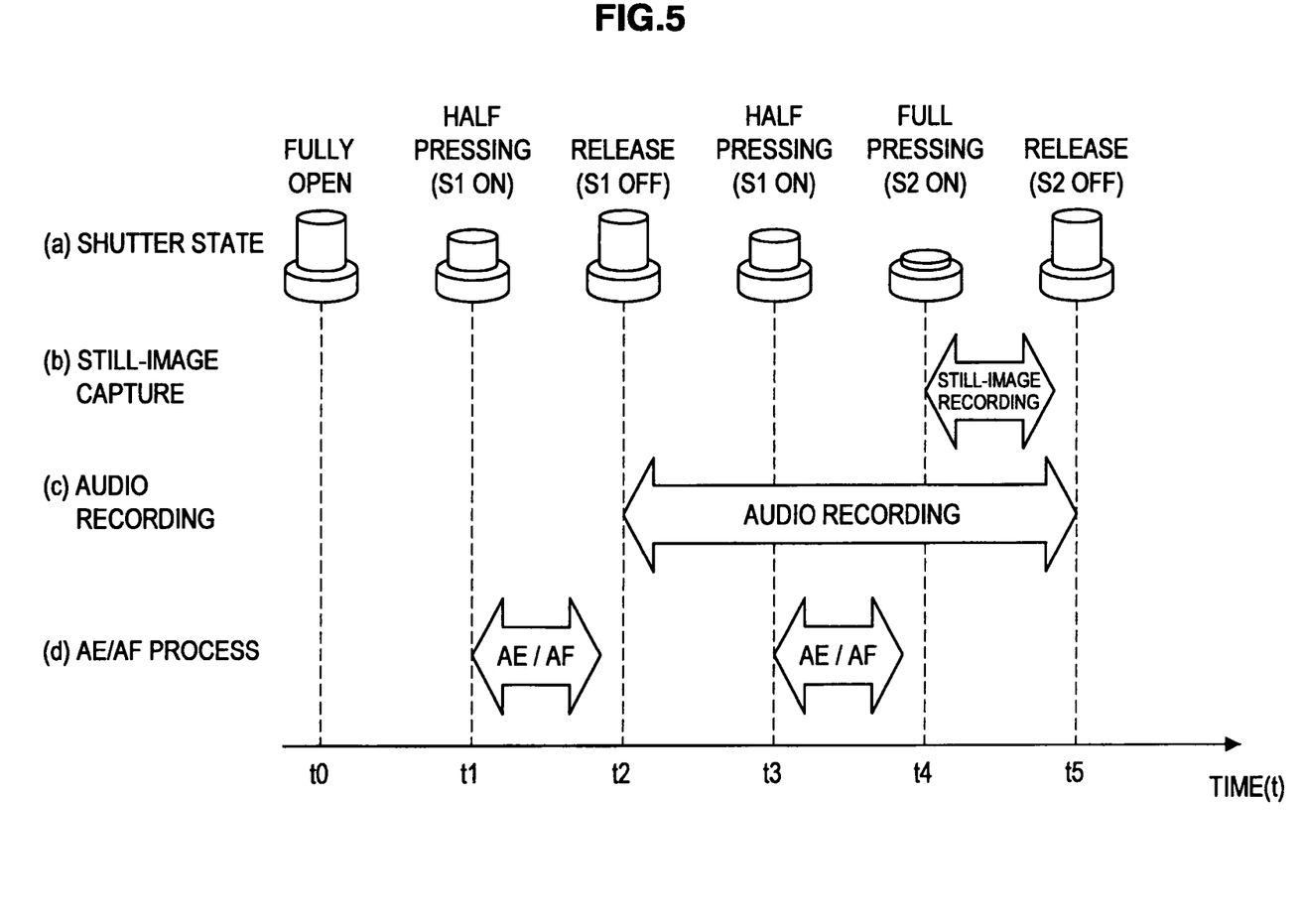
FIG. 5 is a timing chart illustrating an example of a process sequence executed by the imaging device of the present disclosure.

A timing chart of this embodiment 2 is illustrated in FIG. 5 so that the process of this embodiment is further easily understood.

In FIG. 5, timings of (a) shutter state transition, (b) still-image capture timing, (c) audio-recording timing, and (d) AE/AF execution timing are illustrated along a time axis t.

Although shutter states in times t0 to t5 are varied at the same time interval with respect to (a) shutter state transition illustrated in FIG. 5 as in FIG. 3 described above in the first embodiment, a time interval is varied by the user's process.

The following control is executed according to the shutter states of times t0 to t5.

Time: t0

Time t0 corresponds to an initial state.

Time: t1

Time t1 corresponds to a state in which the user has half pressed the shutter. The AE/AF process is executed using the half pressing process as a trigger.

Figure 4:
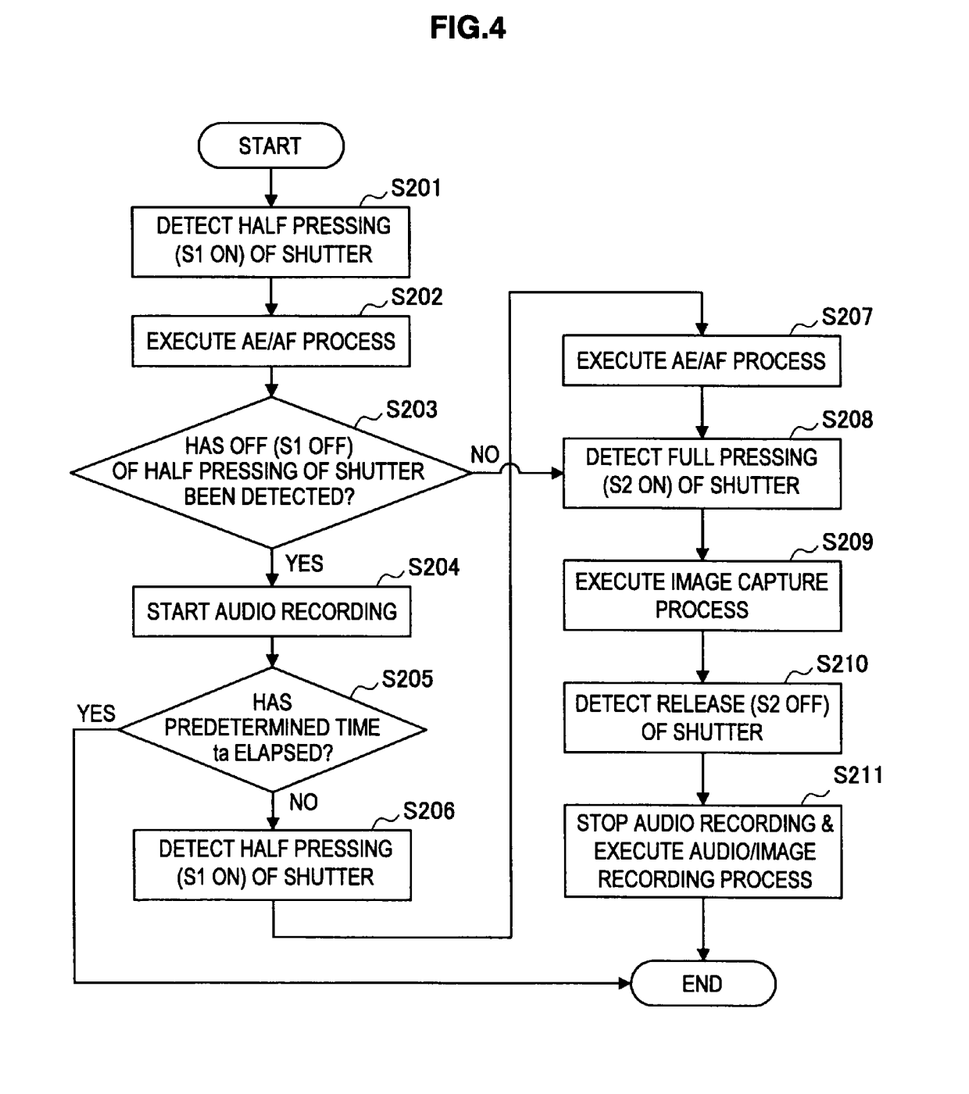
FIG. 4 is a flowchart illustrating an example of a process sequence executed by the imaging device of the present disclosure.

This process corresponds to the process of steps S201 and S202 of the flowchart illustrated in FIG. 4.

Time: t2

Time t2 corresponds to a state returned to the release state after the user half presses the shutter. The audio recording process is started using a process of returning from the half pressing to the full pressing as the trigger.

This process corresponds to the process of steps S203 and S204 of the flowchart illustrated in FIG. 4.

Time: t3

Time t3 corresponds to a state in which the user has half pressed the shutter again in the release state. The AE/AF process is re-executed using a second half pressing process as the trigger.

This process corresponds to the process of steps S206 and S207 of the flowchart illustrated in FIG. 4.

Time: t4

Time t4 corresponds to a process in which the user fully presses the shutter in the half pressed state. An image-capture process is executed using this full pressing process as the trigger.

This process corresponds to the process of steps S208 and S209 of the flowchart illustrated in FIG. 4.

Time: t5

Time t5 corresponds to a process in which the user switches the shutter from the fully pressed state to the release state. The audio recording is ended using the execution of a process of switching from the fully pressed state to the release state as the trigger.

This process corresponds to the process of steps S210 and S211 of the flowchart illustrated in FIG. 4.

As illustrated in FIG. 5, a process of determining the passage of the threshold time ta in step S205 illustrated in FIG. 4 is omitted.

The process of step S205 is executed between times t2 and t3 in FIG. 5. If a period of the times t2 and t3 has exceeded the predetermined threshold time ta, the time-out is reached and the process is ended. This end process corresponds to a process in which Yes is determined in the determination process of step S205 of the flowchart illustrated in FIG. 4.

As understood from the description with reference to FIG. 5, execution timing of each process can be controlled without depending on execution timing of another process with respect to three processes of (b) still-image capture timing, (c) audio-recording timing, and (d) AE/AF execution timing.

Start timing of the audio recording process can be controlled by half pressing and releasing the shutter as a continuous operation.

In addition, end timing of the audio recording process can be controlled at timing when the shutter is switched from the fully pressed state to the release state.

As described above, start and end timings of the audio recording process can be set to free timings without depending on processing timing of another process, that is, the image capture or the AE/AF process, and audio recording can be started and ended according to the user's desire.

4. Other Embodiments

Next, embodiments different from the above-described first and second embodiments will be described.

In the above-described first embodiment, a process (trigger) serving as a condition of the audio-recording start is a series of processes including (a) the half pressing (S1 ON) of the shutter of step S101 of the flowchart of FIG. 2 and (b) the release (S1 OFF) of the half pressing of the shutter of step S103 of the flowchart of FIG. 2.

In addition, the audio recording is ended in step S112, and a process (trigger) serving as a condition of the audio recording end is a process of (c) half pressing (S1 ON) and releasing (S1 OFF) the shutter in step S111 of the flowchart of FIG. 2.

In this embodiment, if the audio recording process is ended, the shutter is half pressed and released during execution of the audio recording process.

An example in which the audio recording process is forcibly ended when half pressing and release are not executed for a fixed time tb in step S110 after an imaging process end has been described in the first embodiment described above. However, for example, after the imaging process end, the audio recording may be set to be continued for an arbitrary time by executing half pressing within the fixed time tb and maintaining the half pressed state.

According to this process, it is possible to further perform audio recording for a long time without ending the audio recording after the passage of the above-described threshold time tb. When this process is executed, a maximum recordable time may be displayed and set on the basis of media capacity or a rule on a format.

A process of displaying a time allowed for audio recording is also applicable to the above-described second embodiment.

In the second embodiment, the audio-recording end timing is finally defined by the release (S2 OFF) of the full pressing of the shutter of step S210 of the flowchart illustrated in FIG. 4. Accordingly, it is possible to extend the audio recording by an arbitrary time, for example, if the fully pressed state of the shutter is continued. In this case, a maximum recordable time may be displayed and set on the basis of media capacity or a rule on a format.

5. Summary of Configuration of Present Disclosure

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
An imaging device including:
a control unit for controlling audio recording to be started and ended according to shutter button operation information,
wherein the control unit determines audio-recording start and end timings by identifying independent shutter button operation information corresponding to audio-recording start and end requests.

(2)
The imaging device according to (1), wherein the control unit determines the audio-recording start and end timings by identifying shutter button operation information different from shutter button operation information as automatic exposure control (AE) or automatic focus control (AF) start control.

(3)
The imaging device according to (1) or (2), wherein the control unit determines the audio-recording start or end timing by identifying a half pressing/release process of a shutter button as the independent shutter button operation information corresponding to the audio-recording start or end request (4)
The imaging device according to any one of (1) to (3), wherein the control unit determines the audio-recording end timing by identifying a full pressing/release process of a shutter button as the independent shutter button operation information corresponding to the audio-recording end request.

(5)
The imaging device according to any one of (1) to (4), wherein the control unit controls the audio recording to be continued for a continuation period of a half pressed state of a shutter button by identifying the half pressed state of the shutter button to be executed during the audio recording.

(6)
The imaging device according to any one of (1) to (5), wherein the control unit controls the audio recording to be continued for a continuation period of a fully pressed state of a shutter button by identifying the fully pressed state of the shutter button to be executed during the audio recording.

(7)
The imaging device according to any one of (1) to (6), wherein the control unit controls the audio recording to be ended according to a passage of a preset time when there is no operation corresponding to the audio-recording end request during the audio recording.

(8)
The imaging device according to any one of (1) to (7), wherein the control unit controls a time allowed for the audio recording to be displayed on a display unit.

In addition, a series of processes described in the specification can be executed by hardware, software, or a combination thereof. If a process is executed by software, it is possible to install and execute a program recording the process sequence in a memory within a computer built in dedicated hardware or install and execute a program in a general-purpose computer in which various processes are executable. For example, the program can be pre-recorded on the recording medium. The program can be installed in a computer from the recording medium. In addition, it is possible to receive the program via a network such as a local area network (LAN) or the Internet and install the program on the recording medium such as a built-in hard disk.

Various processes described in the specification may be executed not only in described time series, but also in parallel or separately according to processing capability of a device that executes the process or necessity. In addition, in this specification, a system is a logical set including a plurality of devices. It is not necessary that the devices be in the same housing.

As described above, an imaging device and an imaging device control method capable of starting and ending audio recording at user-desired timing are implemented according to a configuration of an embodiment of the present disclosure.

Specifically, the user's shutter operation information is input and the start and end of the audio recording are controlled according to the input shutter operation information. Audio-recording start and end timings are determined by identifying independent shutter operation information corresponding to audio-recording start and end requests. For example, audio-recording start and end timings are controlled by identifying the half pressing/release process or the full pressing/release process of the shutter different from shutter operation information used in AE or AF start control.

The present disclosure contains subject matter related to that disclosed in Japanese Priority Patent Application JP 2011-092029 filed in the Japan Patent Office on Apr. 18, 2011, the entire content of which is hereby incorporated by reference.

What is claimed is:
1. An imaging device comprising:
a shutter button; and
circuitry configured to:
control an audio recording to be started and ended according to shutter button operation information;
determine an audio-recording start timing by identifying shutter button operation information corresponding to an audio-recording start request; and
determine an audio-recording end timing by identifying shutter button operation information corresponding to an audio-recording end request, wherein
the audio-recording start request corresponds to a release of the shutter button of the image device from a half-pressed position,
the audio-recording end request corresponds to another release of the shutter button of the image device from the half-pressed position when the circuitry has determined that audio-recording start request has already occurred, and
release of the shutter button from the half-pressed position is not a component of a release of the shutter button from a fully-pressed position.

2. The imaging device according to claim 1, wherein the circuitry is further configured to determine the audio-recording start and end timings by identifying shutter button operation information different from shutter button operation information corresponding to automatic exposure (AE) start control or automatic focus control (AF) start control.

3. The imaging device according to claim 1, wherein the circuitry is further configured to determine the audio-recording end timing by identifying a release of a fully-pressed shutter button as the independent shutter button operation information corresponding to the audio-recording end request.

4. The imaging device according to claim 1, wherein the circuitry is further configured to control the audio recording to be continued for a continuation period of a half-pressed state of the shutter button by identifying the half-pressed state of the shutter button to be executed during the audio recording.

5. The imaging device according to claim 1, wherein the circuitry is further configured to control the audio recording to be continued for a continuation period of a fully-pressed state of the shutter button by identifying the fully-pressed state of the shutter button to be executed during the audio recording.

6. The imaging device according to claim 1, wherein the circuitry is further configured to control the audio recording to be ended according to a passage of a preset period of time during which there is no operation corresponding to the audio-recording end request during the audio recording.

7. The imaging device according to claim 1, wherein the circuitry is further configured to control a time allowed for the audio recording to be displayed on a display unit.

8. The imaging device according to claim 1, wherein the circuitry is further configured to control the audio recording to be ended according to a passage of a preset period of time during which there is no operation of the shutter button.

9. The imaging device according to claim 1, wherein the audio-recording start request further corresponds to a press of the shutter button of the image device to the half-pressed position followed by the release of the shutter button of the image device from the half-pressed position.

10. The imaging device according to claim 1, wherein the audio-recording end request further corresponds to another press of the shutter button of the image device to the half-pressed position followed by the another release of the shutter button of the image device from the half-pressed position.

11. An imaging device control method to be executed in an imaging device, the method comprising:
controlling, by circuitry of the imaging device, an audio recording to be started and ended according to shutter button operation information,
determining an audio-recording start timing by identifying shutter button operation information corresponding to an audio-recording start request, and
determining an audio-recording end timing by identifying shutter button operation information corresponding to an audio-recording end request, wherein
the audio-recording start request corresponds to a release of a shutter button of the image device from a half-pressed position,
the audio-recording end request corresponds to another release of the shutter button of the image device from the half-pressed position when the circuitry has determined that audio-recording start request has already occurred, and
release of the shutter button from the half-pressed position is not a component of a release of the shutter button from a fully-pressed position.

12. A non-transitory computer readable medium storing a program for causing an imaging device to execute an audio-recording control process, the process comprising:
controlling, by circuitry of the imaging device, an audio recording to be started and ended according to shutter button operation information,
determining an audio-recording start timing by identifying shutter button operation information corresponding to an audio-recording start request, and
determining an audio-recording end timing by identifying shutter button operation information corresponding to an audio-recording end request, wherein
the audio-recording start request corresponds to a release of a shutter button of the image device from a half-pressed position,
the audio-recording end request corresponds to another release of the shutter button of the image device from the half-pressed position when the circuitry has determined that audio-recording start request has already occurred, and
release of the shutter button from the half-pressed position is not a component of a release of the shutter button from a fully-pressed position.

* * * * *